United States Patent [19]

Seki et al.

[11] Patent Number: 4,664,506

[45] Date of Patent: May 12, 1987

[54] APPARATUS FOR RECORDING CATHODE-RAY TUBE IMAGE

[75] Inventors: Takatoshi Seki; Taizo Akimoto; Norio Ookawa; Nobuyuki Torisawa, all of Kanagawa, Japan

[73] Assignee: Fuji Photo Film Co., Ltd., Kanagawa, Japan

[21] Appl. No.: 779,911

[22] Filed: Sep. 25, 1985

[30] Foreign Application Priority Data

Sep. 26, 1984 [JP] Japan .................. 59-201283
Sep. 26, 1984 [JP] Japan .................. 59-201284
Sep. 26, 1984 [JP] Japan .................. 59-201286

[51] Int. Cl.$^4$ ............................. G03B 27/72
[52] U.S. Cl. .................................... 355/20
[58] Field of Search ............... 354/76, 90; 355/20

[56] References Cited

U.S. PATENT DOCUMENTS

| 3,388,630 | 6/1968 | Leitner ........................ 354/76 X |
| 3,508,245 | 4/1970 | Purdy et al. .................. 340/324 |
| 3,712,733 | 1/1973 | Giaimo, Jr. .................... 355/3 |
| 3,732,008 | 5/1973 | Lasalle ........................... 355/22 |
| 3,901,593 | 8/1975 | Kogiso et al. ................. 355/11 |
| 4,285,587 | 8/1981 | Schiff et al. ................. 354/76 X |
| 4,481,541 | 11/1984 | Ioannadis et al. ........... 354/76 X |
| 4,592,633 | 6/1986 | Seki et al. ..................... 354/76 |

FOREIGN PATENT DOCUMENTS

| 55-60937 | 3/1980 | Japan . |
| 5925519 | 1/1984 | Japan . |
| 1475895 | 8/1974 | United Kingdom . |

*Primary Examiner*—Donald A. Griffin
*Attorney, Agent, or Firm*—Sughrue, Mion, Zinn, Macpeak & Seas

[57] ABSTRACT

A cathode-ray tube image recording apparatus records a cathode-ray tube image on a film. A lens is disposed on the optical axis of a cathode-ray tube. The light transmitted by the lens is reflected by a mirror so that the path of the light is turned through about 90°, and an image is recorded on a sheet of film. Accordingly, it is possible to reduce the area required for the installation of the apparatus itself.

25 Claims, 27 Drawing Figures

FIG. 5
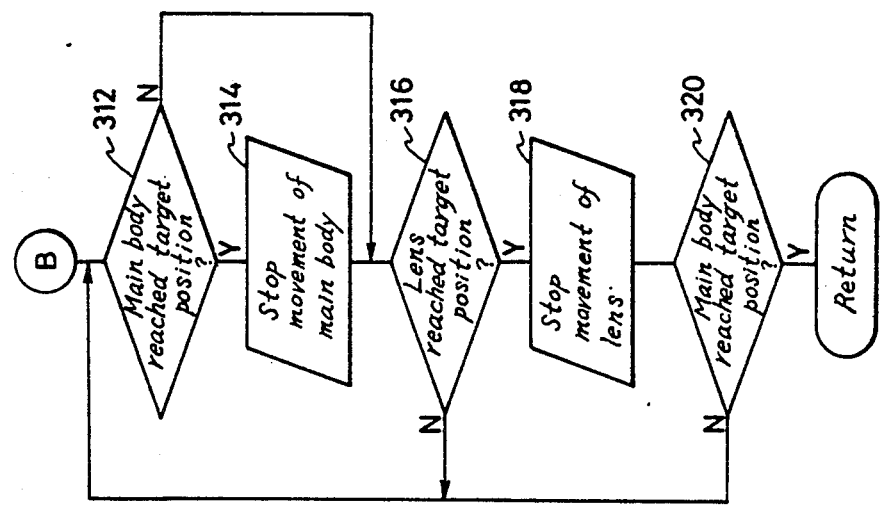
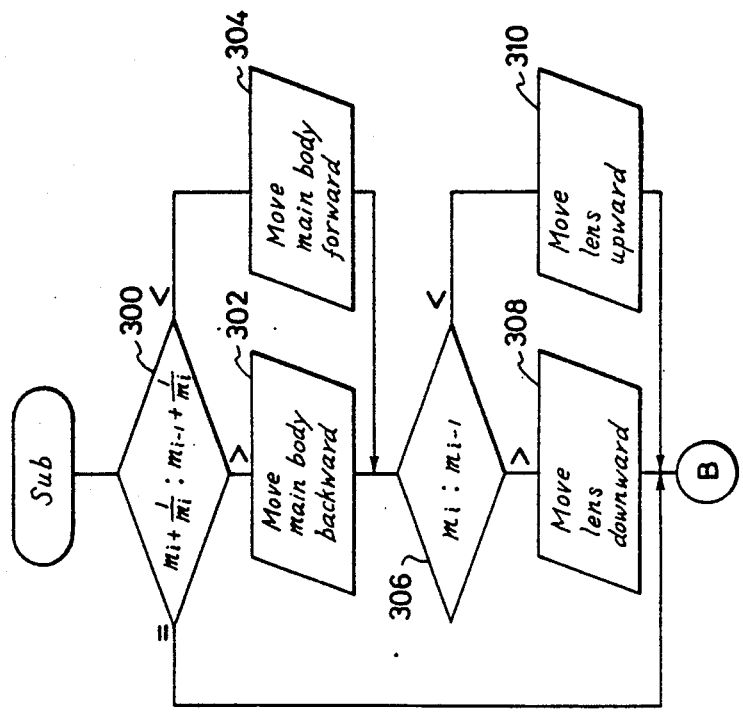

FIG. 6
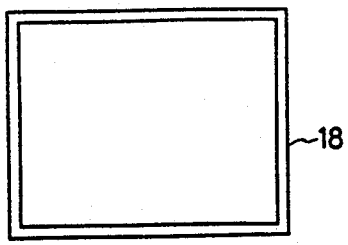
(A)
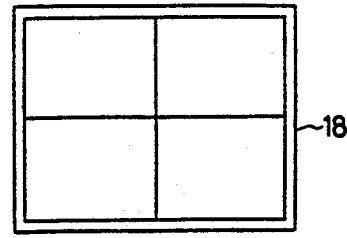
(B)
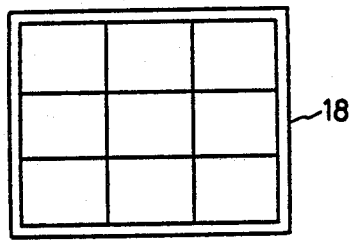
(C)
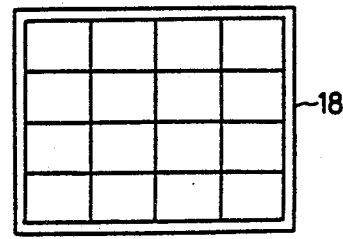
(D)
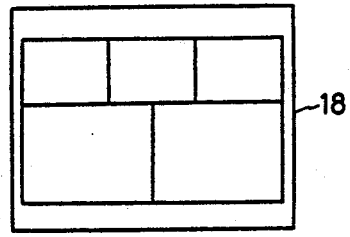
(E)
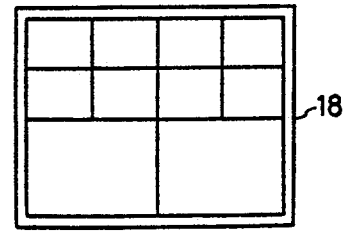
(F)

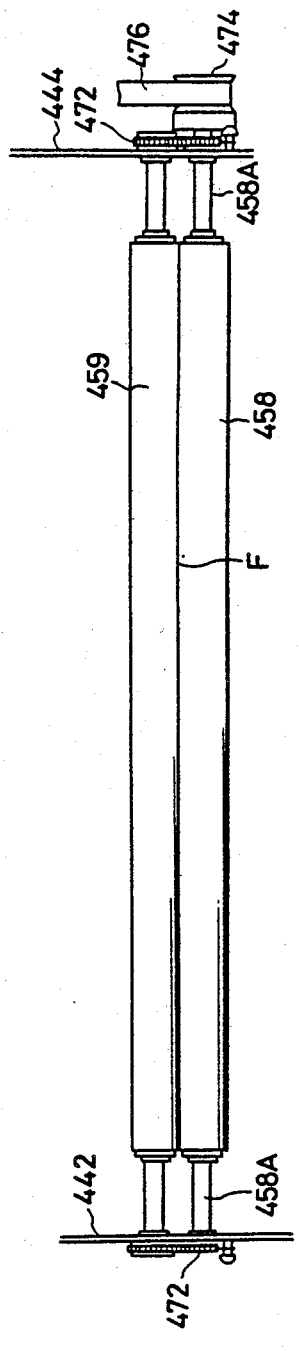
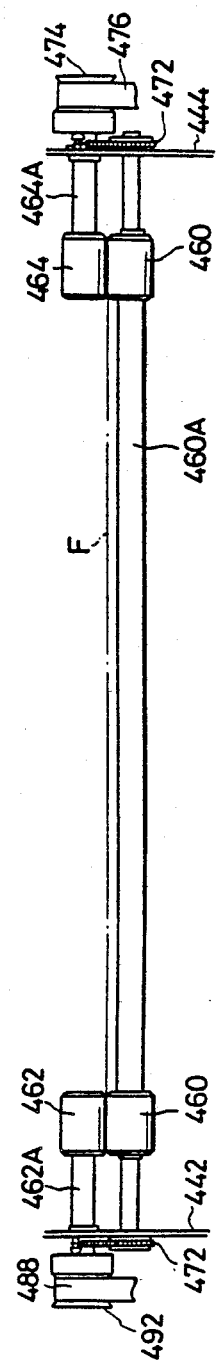
FIG. 10
FIG. 11

APPARATUS FOR RECORDING CATHODE-RAY TUBE IMAGE

BACKGROUND OF THE INVENTION

1. Field of the Invention

The present invention relates to an apparatus for recording an image on a CRT (cathode-ray tube), employed mainly for medical purposes and which is capable of recording a plurality of images on a single sheet of film.

2. Description of the Prior Art

In a conventional variable-magnification CRT image recording, or photographing, apparatus, a mirror is disposed on the optical axis of a CRT so as to orientate the optical path horizontally, and the image displayed on the CRT is recorded on a sheet of film through a lens (see Japanese Utility Model Laid-Open No. 25519/1984). The apparatus enables the record, or photography, of the CRT image at any desired magnification, by moving the CRT and lens appropriately. The movement of each is effected in accordance with values previously stored in a microcomputer for each degree of magnification.

This type of CRT image recording apparatus, however, suffers from the following disadvantages. Since the lens is interposed between the mirror and the film and since the degree of magnification is varied by moving the lens, it is necessary to increase the length of the apparatus, which results in an increase in the area required for the installation of the apparatus.

Further, since there may be variations in the focal lengths of lenses due to dispersions in manufacture, it is necessary, when using the conventional apparatus, to adjust the focus for each degree of magnification selected during photography.

In the medical diagnosis field, one type of apparatus has heretofore been utilized in which a plurality of images displayed on a monitor (CRT) are separately formed on a single sheet of film.

This known type of recording apparatus includes the apparatus which is disclosed in the specification of Japanese Patent Laid-Open No. 60937/1980. In this apparatus, a sheet of film is disposed above a monitor (CRT) whose screen points upward, and a photographic lens is disposed between a film conveyor device and the monitor. The film can be moved by the conveyor device, and the monitor can be moved parallel to the plane of the film. In this way, a plurality of images displayed on the monitor can be separately formed on the surface of a single sheet of film by moving the film and the monitor relative to each other.

This type of recording apparatus, however, suffers from the problem that the film, which is disposed horizontally, may be flexed, or bent, by its own weight, and this may make impossible to obtain good-quality pictures. Support of the film is particularly insufficient in the vicinity of the optical axis, because it is necessary at this position to provide enough space to ensure that the optical path of the exposure light is not obstructed, which results in a large degree of flexure and unreliable conveyance of the film.

When exposure is effected in a state wherein the film is disposed so that its plane is vertical, the film may similarly be flexed between a plurality of rollers constituting the film transporting device, thus adversely affecting the planar characteristics of the film. To overcome this problem, an arrangement is also employed in which each sheet of film is housed in an individual cassette which is positioned in the optical path, and exposure is effected through a window formed in the cassette. However, this arrangement employing cassettes necessitates a troublesome handling operation and a complicated structure.

SUMMARY OF THE INVENTION

In view of the above circumstances, it is a primary object of the present invention to provide a CRT image recording apparatus which requires a reduced installation area for the apparatus and which enables a sheet of film to be reliably supported without obstructing the optical path of the exposure light.

Also, it is another object of the present invention to provide a film transporting mechanism without the film flexure in a CRT image recording apparatus.

It is a further object of the present invention to provide a movable mask mechanism which can assure to support the exposure frame in a CRT image recording apparatus.

To this end, the present invention provides a CRT image recording apparatus in which a lens of a focal length f is disposed on the optical axis of a CRT, and the light transmitted by this lens is reflected by a mirror so that the path of the light is turned through 90°, and an image is then formed on a sheet of film. This lens can be moved along its optical axis by a lens-moving means. The main body on which the CRT, the lens and the mirror are mounted can be moved, together with the lens-moving means in one unit, by a main body-moving means in the direction orthogonal to the plane of the film.

The movements of each of the lens-moving means and the mian body-moving means are controlled by a movement control means. The control means includes an f value input means and an image magnification setting means, and provides the following control. With a photographing, or recording, position at magnification $m_0$ employed as a reference position, when recording, or photographing, at magnification m, the main body is moved from its current position, that is, a recording, or photographing, position at magnification $m_1$ by $(m + 1/m - m_1 - 1/m_1)f$, and the lens is moved from the recording position at magnification $m_1$ by $(1/m - 1/m_1)f$.

The f value input means is arranged such as to input either an error $\Delta$ with respect to a design value $f_0$, or the real f value as it is. The image magnification m is determined in accordance with the recording, or photographic, mode which is set by a photographic mode setting means (which includes a means which directly sets the image magnification).

As an initial adjustment, the recording, or photographing, positions at magnification $m_0$ (reference positions) are determined for the main body and the lens, and a real f value or error $\Delta$ with respect to the design value $f_0$ is set.

The recording mode is then set, and the CRT image recording apparatus is started. The main body is moved to a position which is $(m + 1/m - m_0 - 1/m_0)f$ away from the reference position in the direction orthogonal to the plane of the film. Similarly, the lens is moved to a position which is $(1/m - 1/m_0)f$ away from the reference position along its optical axis.

When the movements of the main body and the lens have been completed, it is possible for the CRT image to be formed on the film.

BRIEF DESCRIPTION OF THE DRAWINGS

These and other objects, features, and advantages of the present invention will become more apparent from the following description of preferred embodiments thereof, taken in conjunction with the accompanying drawings, in which like reference numerals denote like elements, and in which:

FIGS. 4 and 5 are control flow charts;

FIG. 6A-6F illustrate various photographic modes;

FIG. 10 is a section taken along the line X—X of FIG. 9;

FIG. 11 is a section taken along the line XI—XI of FIG. 9;

DESCRIPTION OF THE PREFERRED EMBODIMENTS

A first embodiment of the CRT image recording, or photographing, apparatus according to the present invention is described hereinunder, with reference to the accompanying drawings.

Figure 1:
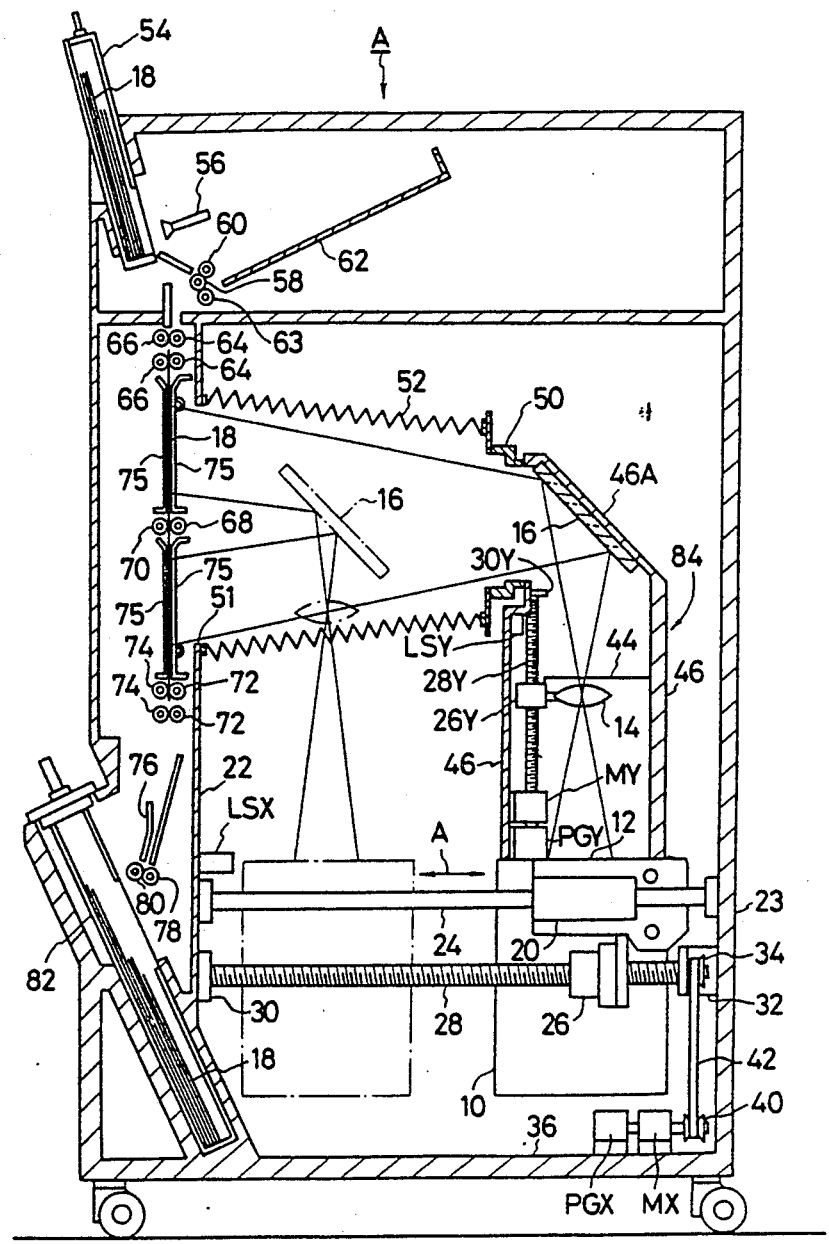
FIG. 1 schematically shows the arrangement of a first embodiment of the CRT image recording apparatus according to the present invention.

Referring first to FIG. 1, the CRT image recording apparatus 1 is arranged such that an image which is displayed on a screen 12 of a CRT 10 is formed on a sheet of film 18 through a lens 14 and a mirror 16. More specifically, the screen 12 of the CRT 10 is disposed in such a manner that the plane of the screen 12 is horizontal, and the lens 14 is disposed on the optical axis of the CRT 10. The mirror 16 is disposed above the lens 14 so as to turn the optical path through 90°. In this way, the image displayed on the CRT 10 is formed on the film 18 which is disposed in such a manner that its plane is vertical.

A cylinder 20 is secured to one side wall of the CRT 10 in such a manner that the axis of the cylinder 20 extends horizontally The cylinder 20 receives a guide bar 24 which is carried horizontally by frame members 22 and 23, whereby the CRT 10 is supported so that it can be moved forward and backward (the directions of arrow A in FIG. 1). A drive cylinder 26 is secured to the side wall of the CRT 10 in such a manner that the axis of the cylinder 26 is horizontal. The drive cylinder 26 has a threaded bore into which a drive shaft 28 is screwed. The drive shaft 28 is rotatably supported by bearings 30 and 32 which are secured to the frame members 22 and 23, respectively. A pulley 34 is secured to the end of the drive shaft 28 which extends through the bearing 32. A motor MX is secured to a base 36, and a pulley 40 is secured to the output shaft of the motor MX. A belt 42 is stretched between the pulleys 34 and 40. Thus, as the motor MX rotates, the drive shaft 28 rotates, and the CRT 10 is thereby moved either forwards or backwards (in one of the directions indicated by the arrow A).

The rotary shaft of a pulse generator PGX is connected to the output shaft of the motor MX in such a manner that the amount of movement of the CRT 10 can be measured by detecting the number of revolutions of the motor MX. A limit switch LSX is secured to the frame member 22 in such a manner that it can establish a reference position for the CRT 10

The lens 14 can be moved vertically together with a shutter 44 by the operation of a drive means which is similar to that for the CRT 10. The members which together constitute the drive means for the lens 14 are denoted by the same reference numerals as those of the corresponding members in the drive means for the CRT 10, with the suffix Y. The exceptions to this rule are a motor MY, a pulse generator PGY, and a limit switch LSY which correspond to the motor MX, the pulse generator PGX, and the limit switch LSX, respectively. A bearing 30Y is secured to a light-shielding plate 46 which is integrally connected to the CRT 10.

Although not shown, another drive means which is similar to that for the CRT 10 is provided to enable the lens 14 to travel parallel to the plane of the screen 12 of the CRT 10.

An upper end portion 46A of the light-shielding plate 46 is bent through 45° toward the film 18. The mirror 16 is bonded to this portion 46A. A bracket 50 is secured to the distal end portion of the light-shielding plate 46, and a bellows 52 for shutting out light is extended between the bracket 50 and the peripheral edge portion of an opening 51 formed in the frame member 22.

A supply magazine 54 loaded with unused or unexposed sheets of film 18 is fitted into an upper portion of the CRT image recording apparatus 1. The reverse side of each sheet of film 18 is held by a vacuum picker 56 and is moved into an area between a drive roller 58 and a press roller 60 so as to be clamped therebetween. After the vacuum pressure has been cancelled, the drive roller 58 rotates in such a manner that the film 18 is placed temporarily on a guide plate 62. The film 18 then moves toward the drive roller 58 under its own weight, and is then conveyed to an exposure position while being successively clamped between each of sets of drive rollers and press rollers 58 and 63; 64 and 66; 68 and 70; and 72 and 74. It must be noted that the drive rollers 68 are positioned in such a manner that they face only the right and left edge portions of the film 18. At the exposure position, the right and left edge portions of the film 18 are clamped between corresponding clamp members 75.

A guide 76, a drive roller 78, and a press roller 80 are provided below the exposure position. When the exposure of one sheet of film 18 has been completed, the drive rollers 64, 68, 72, and 78 are actuated so that they rotate and move the film 18 into a housing magazine 82.

Figure 2:
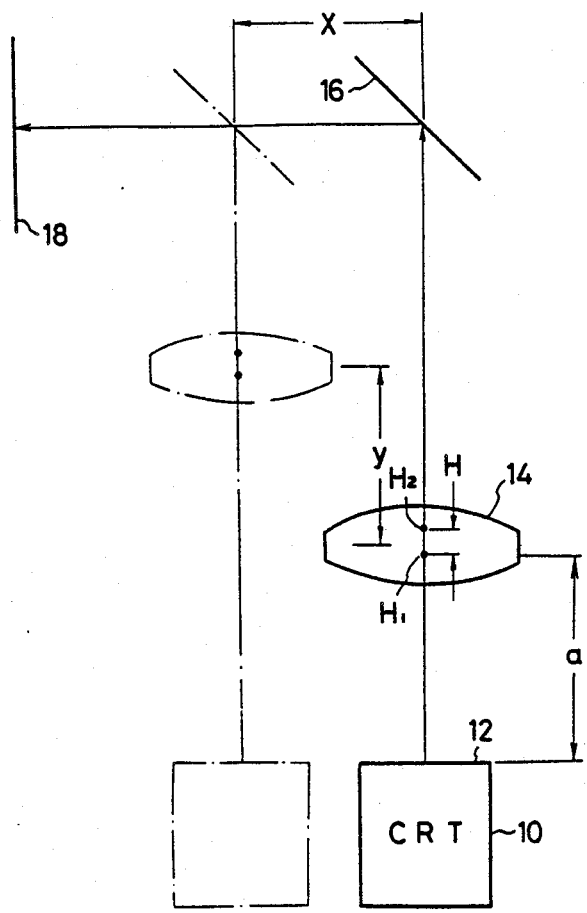
FIG. 2 is a view illustrating the movements of each of the main body and the lens of the apparatus shown in FIG. 1.

The amounts by which each of the CRT 10 and the lens 14 moves for given image magnification m are described hereinunder with reference to FIG. 2. As is well known, the formation of an image by a lens is expressed by the following formula:

$$1/a + 1/b = 1/f \quad (1)$$

The image magnification (lateral magnification) is expressed by the following formula:

$$m = b/a \quad (2)$$

If a and b in the above formulae are expressed as functions of m and f, the following formulae are obtained:

$$a(m) = (1/m + 1)f \quad (3)$$

$$b(m) = (m + 1)f \quad (4)$$

In these formulae, a represents the distance from the screen 12 of the CRT 10 to a first cardinal point $H_1$ of the lens 14, b represents the optical path length from a second cardinal point $H_2$ of the lens 14 to the film 18, and f represents the real focal length of the lens 14, which has an error $\Delta f$ from a design value $f_0$. The distance H between the cardinal points also has an error $\Delta H$ from a design value $H_0$.

The optical path length L(m) from the screeen 12 to the film 18 is given by:

$$L(m) = a(m) + b(m) + H \quad (5)$$

The amounts x and y of movement of the CRT 10 and the lens 14 from a photographic position at magnification $m_0$ to a photographic position at magnification m are obtained from Formulae (3), (4), and (5) as follows (x is positive to the right of a reference position, and y is positive downward from the reference position, as viewed in FIG. 2):

$$x = L(m) - L(m_0) = (m + 1/m - m_0 - 1/m_0)f \quad (6)$$

$$y = a(m) - a(m_0) = (1/m - 1/m_0)f \quad (7)$$

As is clear from Formula (6), x is obtained from the difference between the optical path lengths L, and is therefore independent of H. For that reason, if an initial position adjustment is effected using the photographic position at magnification $m_0$ as a reference position, it is unnecessary to consider any possible error in H.

It must be noted that the above relationship expressions also hold for a combination of lens.

The following is a description of the photographic modes.

FIGS. 6(A) to 6(D) exemplarily show photographic modes according to which one or a plurality of images are formed on a single sheet of film 18. In accordance with other photographic modes, images of different degrees of magnification can be formed on a single sheet of film 18, as shown in FIGS. 6(E) and 6(F). As can be seen from FIG. 1, the main body 84, which is equipped with the CRT 10, the lens 14 and the mirror 16, does not move vertically. Therefore, image positioning in the vertical direction is determined by moving the film 18 vertically by the rotation of the drive rollers 64, 68, and 72.

Figure 3:
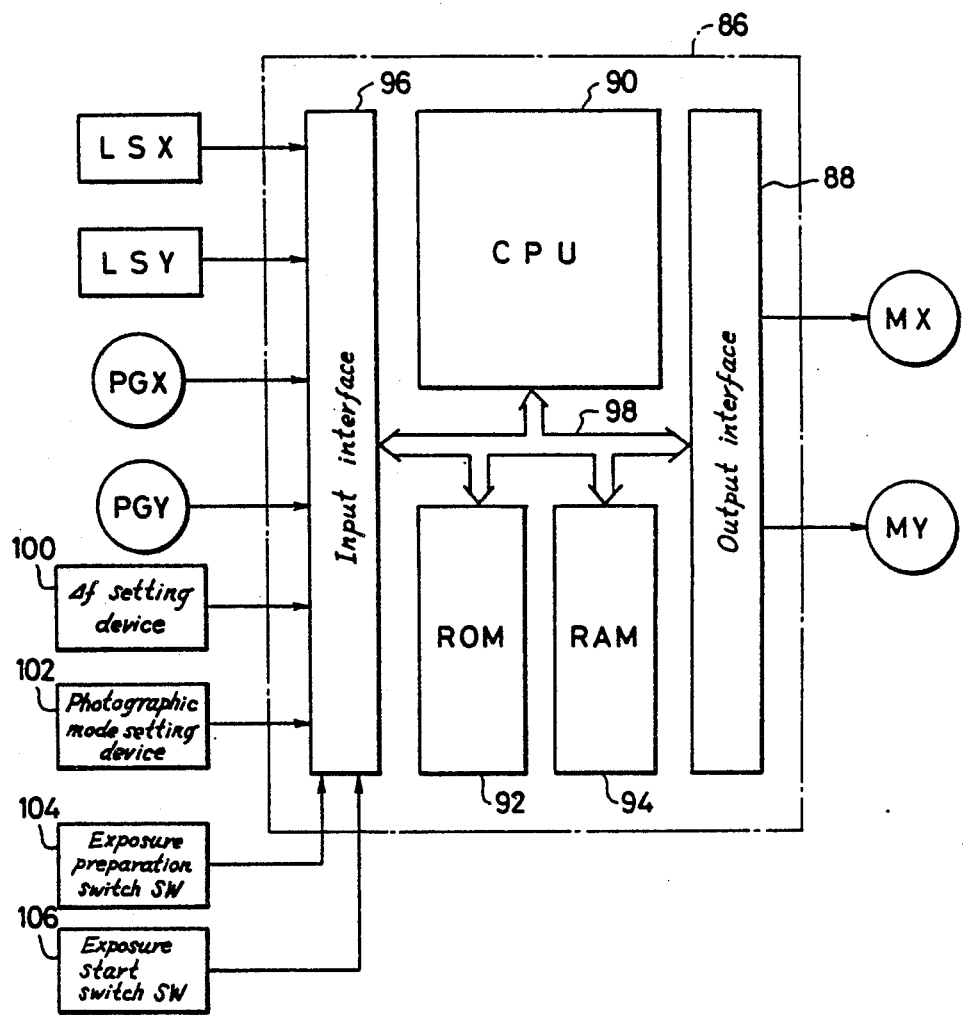
FIG. 3 is a diagram of the control circuit of the apparatus shown in FIG. 1.

A circuit for controlling the amounts x and y of movement of the CRT 10 and the lens 14 will next be described with reference to FIG. 3. It must be noted that description of the control of their movement in a direction parallel to the plane of the screen 12 (i.e., in the lateral direction of the film 18) is omitted for the purpose of simplification. The motor MX for horizontally moving the main body 84 and the motor MY for vertically moving the lens 14 are respectively supplied with drive signals from an output interface 88 of a microcomputer 86.

The microcomputer 86 includes a CPU 90, a ROM 92, a RAM 94, an input interface 96, the output interface 88, and a bus 98 which connects them together.

To the input interface 96 are connected the limit switches LSX, LSY for detecting the respective reference positions (the photographic positions at magnification $m_0$) of the main body 84 and the lens 14, the pulse generators PGX, PGY for detecting the respective amounts of movement of the main body 84 and the lens 14, $\Delta f$ setting device 100 for setting an error of a focal length f from a design value $f_0$, a photographic mode setting device 102, an exposure preparation switch 104 for inputting an exposure preparation start signal, and an exposure start switch 106 for inputting an exposure start signal. The $\Delta f$ setting device 100 and the photographic mode setting device 102 are constituted by digital setting devices, respectively.

It must be noted that the design value $f_0$ is previously stored in the ROM 92 and $\Delta f$ alone is set so that the number of required digits of the $\Delta f$ setting device 100 is reduced. The image magnification m is determined by the photographic mode set by the photographic mode setting device 102 and the exposed position (e.g., the lower portion in FIG. 6(E)) of the film 18 and is obtained with reference to a table stored in the ROM 92.

Figure 4:
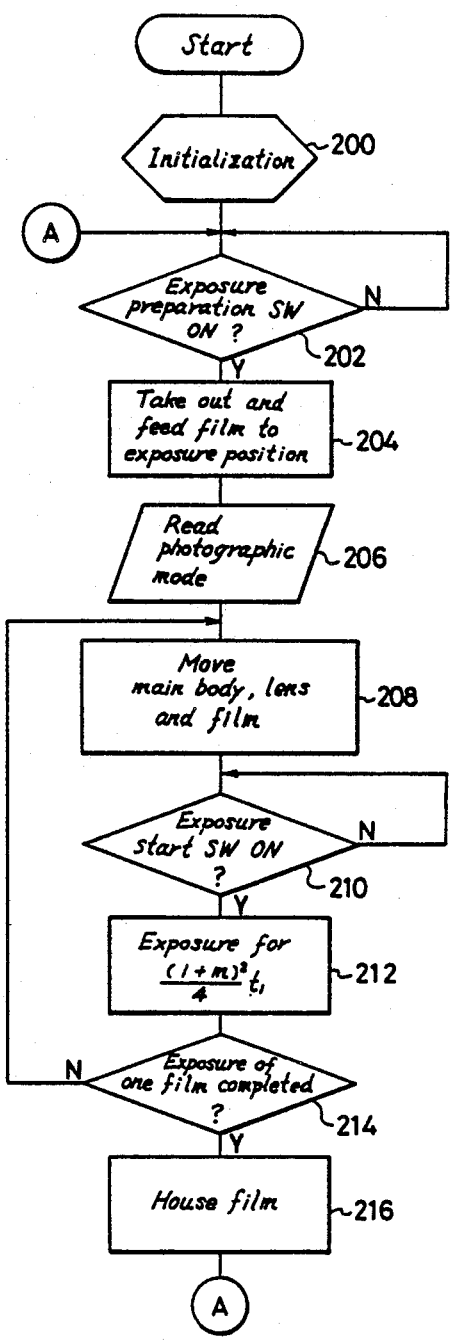

The control flow will now be described with reference to flow charts respectively shown in FIGS. 4 and 5. In the following description, "(Step 200)", for example, will be referred to simply as "(200)".

When the power supply is turned ON, the work area of the RAM 94 is initialized in Step 200. In addition, the main body 84 and the lens 14 are moved to their respective reference positions, that is, the photographic position at magnification $m_0$, and counters X and Y for counting amounts of movement are cleared. When the exposure preparation switch 104 is turned ON (202), a sheet of film 18 is taken out from the supply magazine 54 and is conveyed to the exposure position (204). Then, a photographic mode is read out from the photographic mode setting device 102 (206). In accordance with the read photographic mode, the image magnification m is determined with reference to the table in the ROM 92, and the main body 84, the lens 14 and the film 18 are appropriately moved to make preparations for exposure (208). The details of movement of the main body 84 and the lens 14 are shown in FIG. 5 and will be described later.

When the exposure start switch 106 is turned ON (210), the shutter 44 opens for a period of time $(1+m)^2 t_1/4$, thereby effecting exposure (212). In this case, $t_1$ represents an exposure time at an actual-size photographic position (the position at which $m=1$).

When exposure has not yet been completed with respect to a single sheet of film 18, the process returns to the above Step 208; when exposure has been completed, the film 8 is moved into the housing magazine 82 (214 and 216).

The following is a description of the control of movement of the main body 84 and the lens 14, which constitutes a part of the control operation carried out in the above Step 208. It is now assumed that the image magnification employed in the last photographic operation is $m_{i-1}$, and that for this time is $m_i$.

The movement of the main body 84 is effected in accordance with Formula (6). More specifically, when $m_i + 1/m_i < m_{i-1} + 1/m_{i-1}$, the main body 84 is moved backward (in the direction in which the main body 84 moves away from the film 18) (300 and 302); when $m_i + 1/m_i < m_{i-1} + 1/m_{i-1}$, the main body 84 is moved forward (in the direction in which the main body 84 moves toward the film 18) (300 and 304).

On the other hand, the lens 14 is moved in accordance with Formula (7). When $m_i > m_{i-1}$, the lens 14 is moved downward (toward the CRT 10) (306 and 308); when $m_i < m_{i-1}$, the lens 14 is moved upward (306 and 310).

The outputs which are respectively generated in Steps 302, 304, 308 and 310 are hold outputs by which the number of pulses which are output from the pulse generators PGX and PGY in accordance with the movements of the main body 84 and the lens 14 are counted. Thus, when the main body 84 has reached the target position (the photographic position at magnification m), the movement of the main body 84 is stopped (312 and 314), and when the lens 14 has reached the target position, the movement of the lens 14 is stopped (316 and 318). When both the main body 84 and the lens 14 have reached their respective target positions (320), the process returns to the main routine.

It must be noted that the arrangement may be such that an f value setting device which directly inputs the real f value is provided in place of the Δf setting device 100, and a setting device is additionally provided which sets the magnification $m_0$ at the reference positions (at which the limit switches LSX and LSY are turned ON), thereby allowing lenses 14 having different focal lengths to be interchanged with one another.

Figure 7:
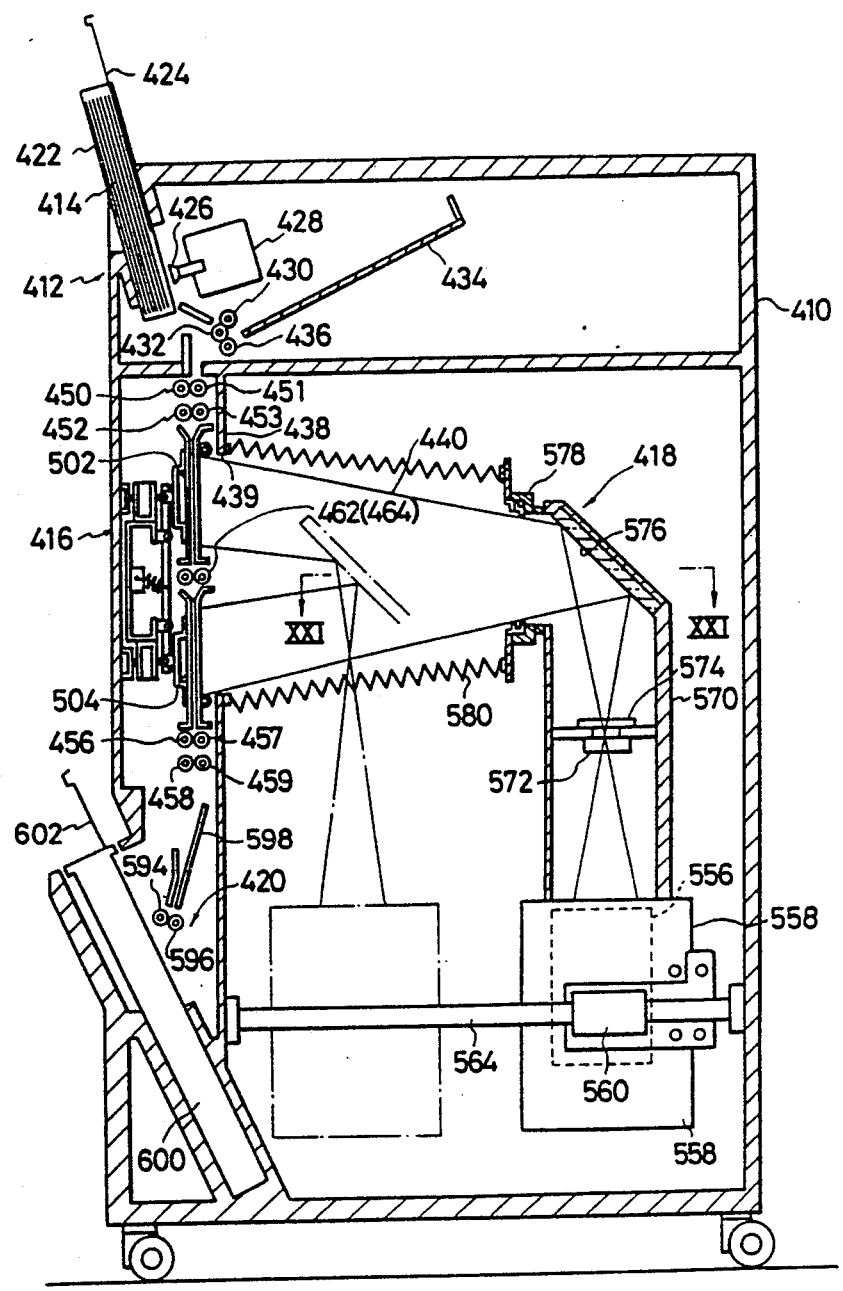
FIG. 7 is a section through a second embodiment of the CRT image recording apparatus according to the present invention.

Referring next to FIG. 7, there is shown a second embodiment of the present invention in which the CRT image recording apparatus is applied to a separate photographic operation in which a plurality of images are separately formed on a single sheet of film. This apparatus is arranged such that a multiplicity of sheets of film 414 are housed in a film supply section 412 which is positioned at the upper portion of a frame 410, and each sheet of film 414 is fed to a film retaining section 416 and is subjected to exposure by an exposure unit 418 before being conveyed to a film housing section 420.

(The arrangement of the film supply section 412)

The upper portion of the frame 410 is designed to enable a magazine 422 loaded with a plurality of sheets of film 414 to be inserted fitted thereinto. When a cover 424 is moved to open the lower end portion of the magazine 422, the lower end portion of the uppermost film 414 directly faces a suction pad 426 which is disposed inside the frame 410. The suction pad 426 is actuated by a drive unit 428 to hold the leading or lower end portion of the uppermost film 414 within the magazine 422 and to feed the film 414 into an area between feed rollers 430 and 432.

The feed rollers 430 and 432 are connected to a motor (not shown) and adapted to feed the film 414 drawn out from the magazine 422 onto a guide plate 434. This guide plate 434 is slanted in such a manner that one side thereof which is remote from the feed rollers 430 and 432 is higher than the other side thereof. Thus, the film 414 which is placed temporarily on the guide plate 434 moves into an area between the feed rollers 432 and 436 from its trailing end by its own weight. Accordingly, the film 414 is held by the suction pad 426 at its reverse side which is opposite to the emulsion-coated side, and after being taken out onto the guide plate 434, the film 414 is clamped between the feed rollers 432 and 436 so as to be fed to the film retaining section 416.

(The arrangement of the film retaining section 416)

Figure 8:
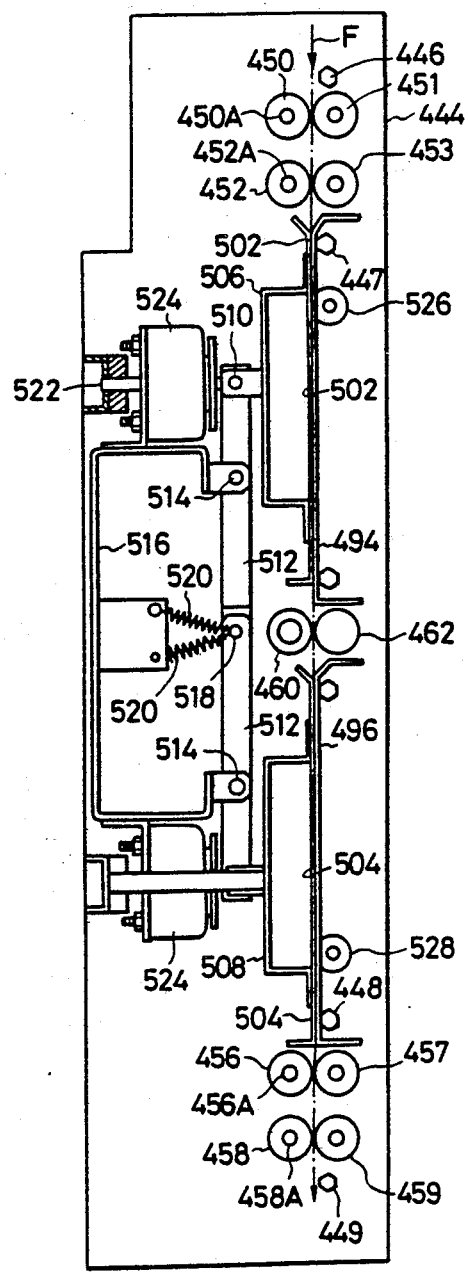
FIG. 8 is an enlarged view of an essential portion of the apparatus shown in FIG. 7.
Figure 9:
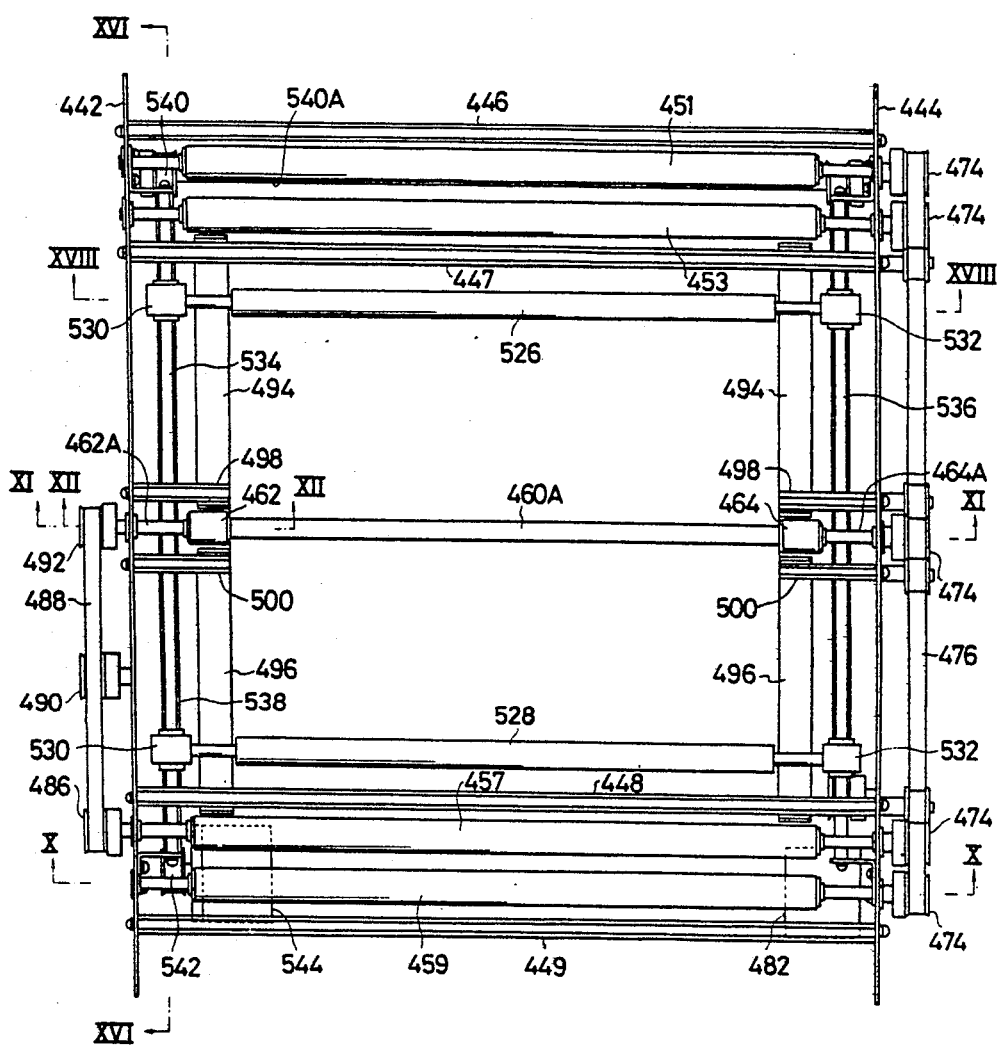
FIG. 9 is side elevation of the portion of the apparatus shown in FIG. 8, viewed from the right-hand side thereof.

At the film retaining section 416, an opening 439 is formed in a vertical wall 438 which is secured to the frame 410, and an optical path 440 of exposure light is provided within the opening 439, as shown in FIG. 7. A pair of brackets 442 and 444, which are shown in FIGS. 8 and 9, are secured to the vertical wall 438 in such a manner that their respective axes extend vertically in parallel to each other. Hexagonal bars 446, 447, 448 and 449 are stretched between these brackets 442 and 444, each bar having its axis extending horizontally, thereby maintaining a predetermined distance between the brackets 442 and 444.

Between the hexagonal bars 446 and 447 are rotatably supported a pair of guide rollers 450 and 451 and another pair of guide rollers 452 and 453 for conveying the film 414 fed from the film supply section 412. Similarly, pairs of guide rollers 456, 457 and 458, 459 are rotatably supported between the hexagonal bars 448 and 449 for conveying the film 414. The reference symbol F in FIG. 8 represents the locus of movement of the film 414 thus conveyed Between the hexagonal bars 447 and 448, a pair of reverse-side rollers 460 are disposed on the side of the film moving locus F which is opposite to the exposed surface of the film 414, while obverse-side rollers 462 and 464 are disposed on the side of the film moving locus F which is closer to the exposed surface of the film 414, the rollers 460, 462 and 464 being rotatably supported by the brackets 442 and 444. As also shown in FIG. 11, the reverse-side rollers 460 are carried on a roller shaft 460A which has both its end portions rotatably supported by the brackets 442 and 444, respectively The obverse-side rollers 462 and 464 are respectively carried by roller shafts 462A and 464A which are rotatably supported by the respective brackets 442 and 444 in a cantilever fashion. By virtue of this arrangement, it is possible for the portion of the film 414 disposed between the obverse-side rollers 462 and 464 to face the exposure unit 418, and it is possible for the optical path 440 of exposure light to reach the emulsion layer side of the film 414 without any obstacle. These obverse-side rollers 462 and 464 or the reverse-side rollers 460 are preferably provided on thier outer peripheries with friction increasing means, such as a rubber or felt material which has high frictional characteristics.

Figure 12:
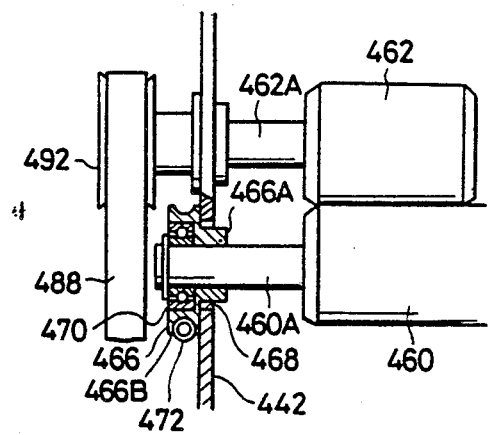
FIG. 12 is a section taken along the line XII—XII of FIG. 9.
Figure 13:
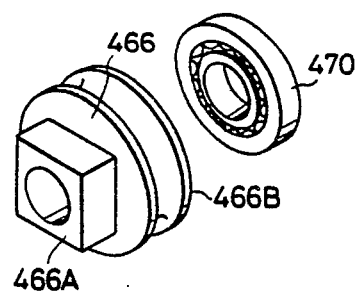
FIG. 13 is an exploded perspective view of a portion of the apparatus shown in FIG. 12.

As shown in FIG. 12, both end portions of the roller shaft 60A extend through respective bearings 466 made of a synthetic resin. Each of the bearings 466 is, as also shown in FIG. 13, composed of a block-shaped portion 466A which constitutes one of its axial peripheries and a pulley-shaped portion 466B which constitutes the other axial periphery. The block-shaped portion 466A is inserted into a guide bore 468 which is formed in each of the brackets 442 and 444. Each guide bore 468 has dimensions which are so selected that the block-shaped portion 466A is movable by a slight amount in the direction in which it moves toward and away from the corresponding one of the roller shafts 462A and 64A, thus constituting a guide means which enables the reverse-side rollers 460 to move toward and away from the obverse-side rollers 462 and 464.

The outer ring of a ball bearing 470 is secured to the inner periphery of the pully-shaped portion 466B, and the inner ring of the ball bearing 470 supports the roller shaft 60A.

An axially central portion of a tension coil spring 472 is passed over the pulley-shaped portion 466B. Both end portions of the spring 472 are retained by the corresponding one of the brackets 442 and 444. Thus, the springs 472 bias the reverse-side rollers 460 toward the obverse-side rollers 462 and 464 through the bearings 466. However, since the roller shaft 460A is rotatably supported by the ball bearings 470, the reverse-side rollers 460 can rotate smoothly, thus allowing the film 414 to be properly conveyed while being clamped between the reverse-side rollers 460 and the obverse-side rollers 462 and 464.

Roller shafts 450A, 452A, 456A, and 458A which respectively carry the guide rollers 450, 452, 456, and 458 are also rotatably supported by the brackets 442 and 444 through associated bearings 66 and ball bearings 470 in a manner similar to that of the roller shaft 460A. The guide rollers 450, 452, 456, and 458 are also respectively pressed against the guide rollers 451, 453, 457, and 459 by means of the respective biasing forces of tension coil springs 472.

Figure 14:
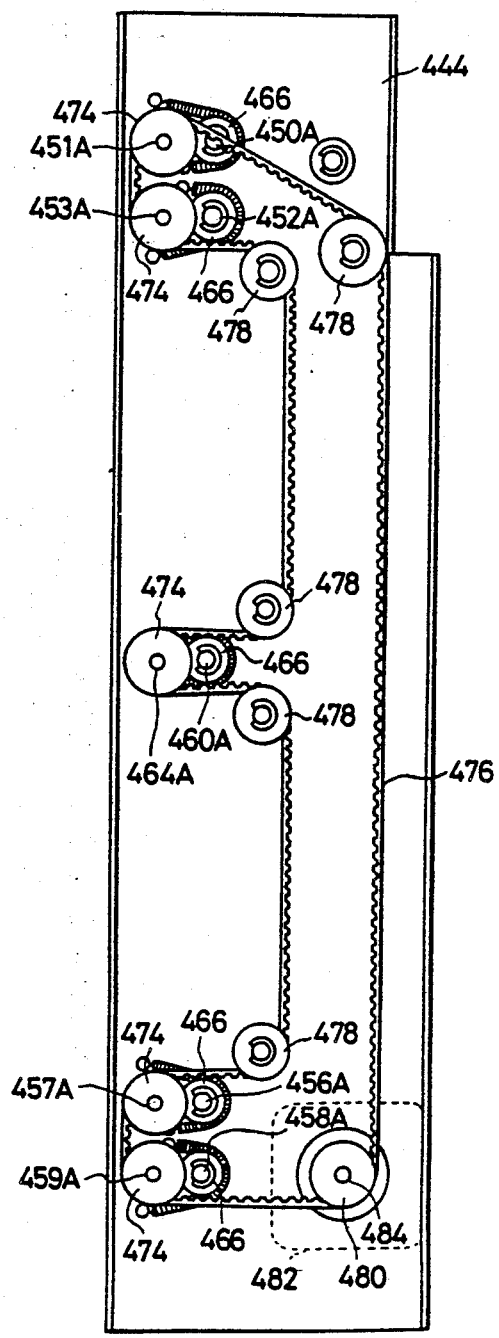
FIG. 14 is a side elevation of the portion of the apparatus in FIG. 9, viewed from the right-hand side thereof.

As shown in FIG. 14, pulleys 474 are secured to the respective portions of roller shafts 451A, 453A, 464A, 457A, and 459A which project from the bracket 444, and a timing belt 476 is passed over these pulleys 474. Intermediate portions of the loop of the timing belt 476 are bent by means of a plurality of tension pulleys 478 which are rotatably supported by the bracket 444. Another intermediate portion of the loop of the timing belt 476 is passed over an output shaft pulley 480 which is secured to the output shaft 484 of a motor 482 which is in turn secured to the bracket 444. Accordingly, the motor 482 can transmit its rotational force to each of the guide rollers and the obverse-side roller 464 through the timing belt 476.

Figure 15:
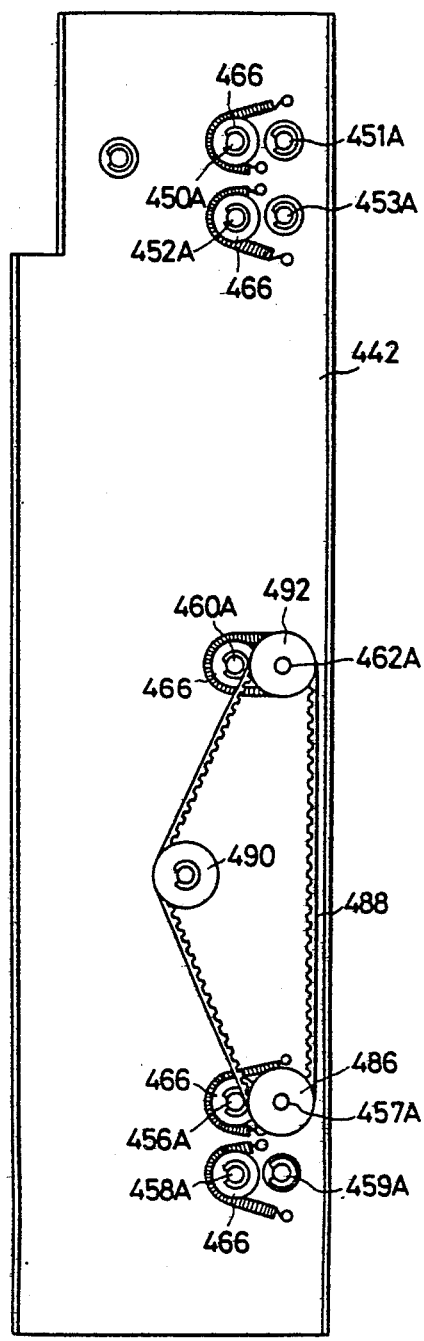
FIG. 15 is a side elevation of the portion of the apparatus shown in FIG. 9, viewed from the left-hand side thereof.

As shown in FIG. 15, a pulley 486 is secured to the portion of the roller shaft 457A which projects from the bracket 442. A timing belt 488 is passed over the pulley 486. The intermedite portion of the timing belt 488 is passed over a tension pulley 490 and a pulley 492 which is secured to the roller shaft 462A. Accordingly, the rotational force of the motor 482 is also transmitted to the obverse-side roller 462 through the roller shaft 457A and the timing belt 488. In this way, both lateral edge portions of the film 414 are respectively clamped by a pair of reverse- and obverse-side rollers 460 and 462 and a pair of reverse- and obverse-side rollers 460 and 464 so as to be conveyed thereby.

Figure 16:
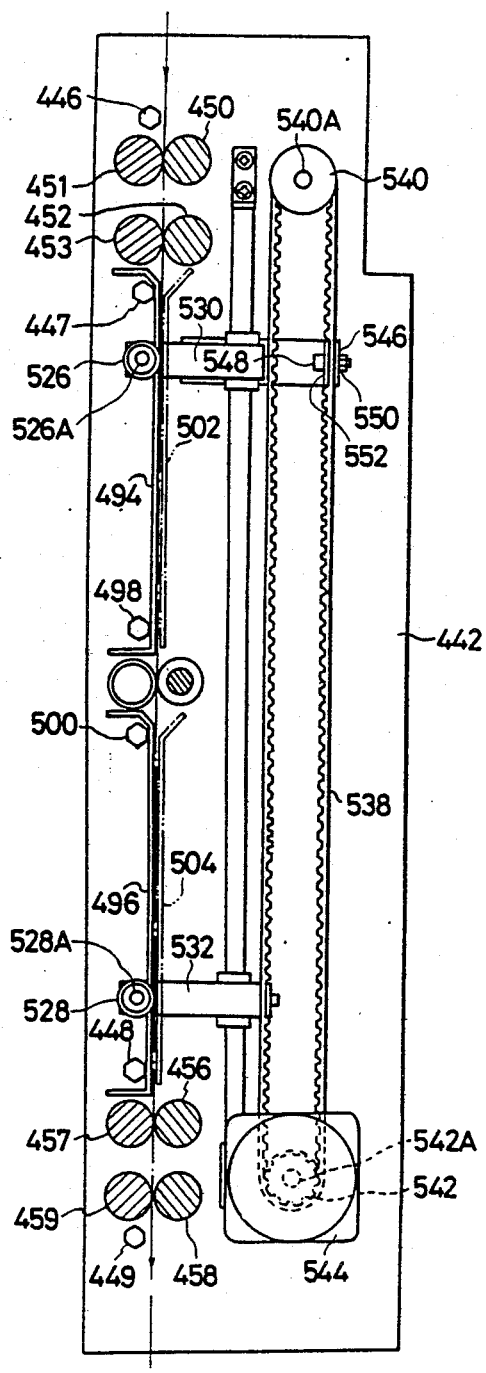
FIG. 16 is a section taken along the line XVI—XVI of FIG. 9.

As shown in FIGS. 9 and 16, two pairs of guide plates 494 and 496 are provided, and one end of each guide plate 494 is secured to the hexagonal bar 447, while one end of each guide plate 496 is secured to the hexagonal bar 448. The pairs of guide plates 494 and 496 respectively correspond to the lateral edge portions of the film 414 when it is conveyed. The other end portions of each guide plate 494 and each guide plate 496 are secured to the respective distal end portions of the corresponding one of the two pairs of hexagonal bars 498 and 500, one pair projecting from the bracket 442, and the other pair projecting from the bracket 444. These guide plates 494 and 496 are adapted to guide the lateral edge portions of the conveyed film 414 at the side thereof on which the emulsion layer exists and which faces the optical path of the exposure light.

Figure 17:
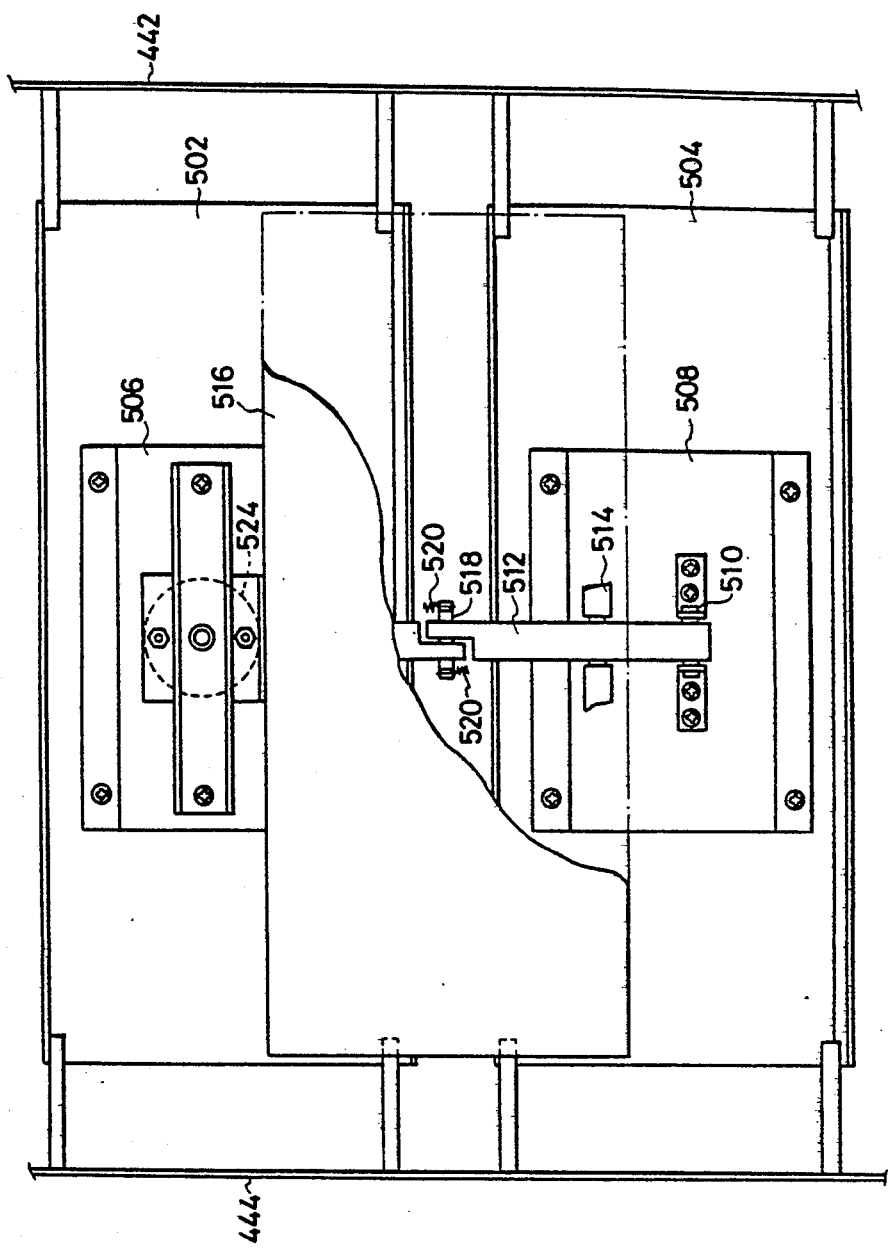
FIG. 17 is a side elevation of the portion of the apapratus shown in in FIG. 8, viewed from the left-hand side
Figure 18:
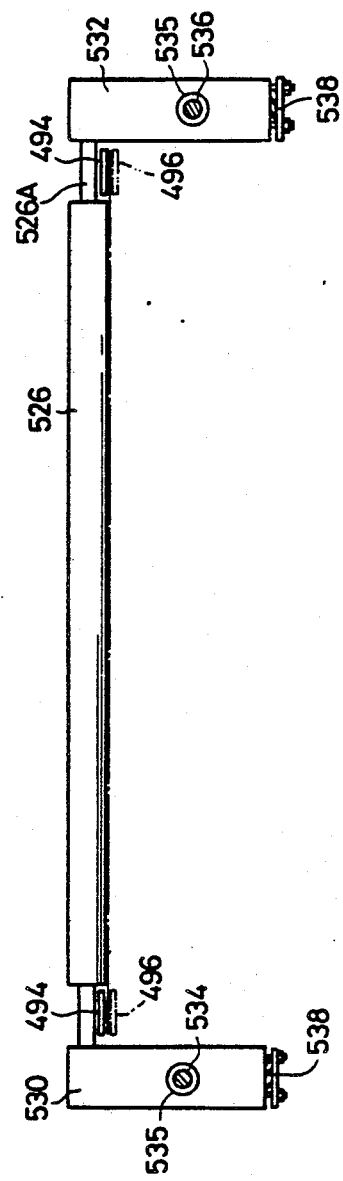
FIG. 18 is a section taken along the line XVIII—XVIII FIG. 9.

Pressure plates 502 and 504 (shown in FIGS. 8 and 17) which serve as retainer means are respectively pressed against the guide plates 494 and 496 through the film 414 from the side thereof which is opposite to the emulsion-coated side, thus clamping the film 414 therebetween so that it is appropriately supported during exposure. Support brackets 506 and 508 are secured to the respective reverse surfaces of the pressure plates 502 and 504. Each of the support brackets 506 and 508 is pivotally supported at one end of a lever 512 through a pin 510.

The intermediate portions of the levers 512 are pivotally supported through respective pins 514 by a base plate 516 which is secured to the frame 410 shown in FIG. 7. The other end portions of the pair of levers 512 are connected together by a pin 518, and a tension coil spring 520 is extended between the pin 518 and the base plate 516. Accordingly, the levers 512 are biased in such a manner as to press the pressure plates 502 and 504 against the guide plates 494 and 496 so as to clamp the film 414 therebetween.

Plungers 522 which project to the respective rear sides of the support brackets 506 and 508 extend through respective solenoids 524 which are secured to the base plate 516. These solenoids 524 are excited when the film 414 is conveyed in such a manner that the pressure plates 502 and 504 are separated from the guide plates 494 and 496 so as to allow the film 414 to be conveyed. When exposure is effected, the solenoids 524 are de-energized, and the pressure plate 502 and 504 are pressed against the guide plates 494 and 496 by means of the biasing force of the tension coil spring 520.

As shown in FIG. 9, masking rollers 526 and 528 are positioned above and below the obverse-side rollers 462 and 464 in such a manner that their respective axes are horizontal. The rollers 526 and 528 are rotatably supported by roller shafts 526A and 528A, respectively. Both end portions of each of the rollers 526 and 528 are secured to movable blocks 530 and 532 which are positioned outside the guide plates 494 and 496. Guide rods 534 and 536 which serve as straight guiding means respectively extend through the movable blocks 530 and 532, the guide rods being respectively secured to the brackets 442 and 444 in such a manner that their axes are vertical. Accordingly, it is possible for the movable blocks 530 and 532 to move straight along the respective axes of the guide rods 534 and 536 through associated slide bearings 535.

Each of the movable blocks 530 and 532 is secured to a timing belt 538 which is stretched between pulleys 540 and 542. The pulley shafts 540A and 542A of the pulleys 540 and 542 are rotatably supported by the brackets 442 and 444, respectively. The pulley shaft 542A which is rotatably supported by the bracket 442 is connected to a motor 544 which transmits its rotational force to the pulley shaft 542A.

Figure 19:
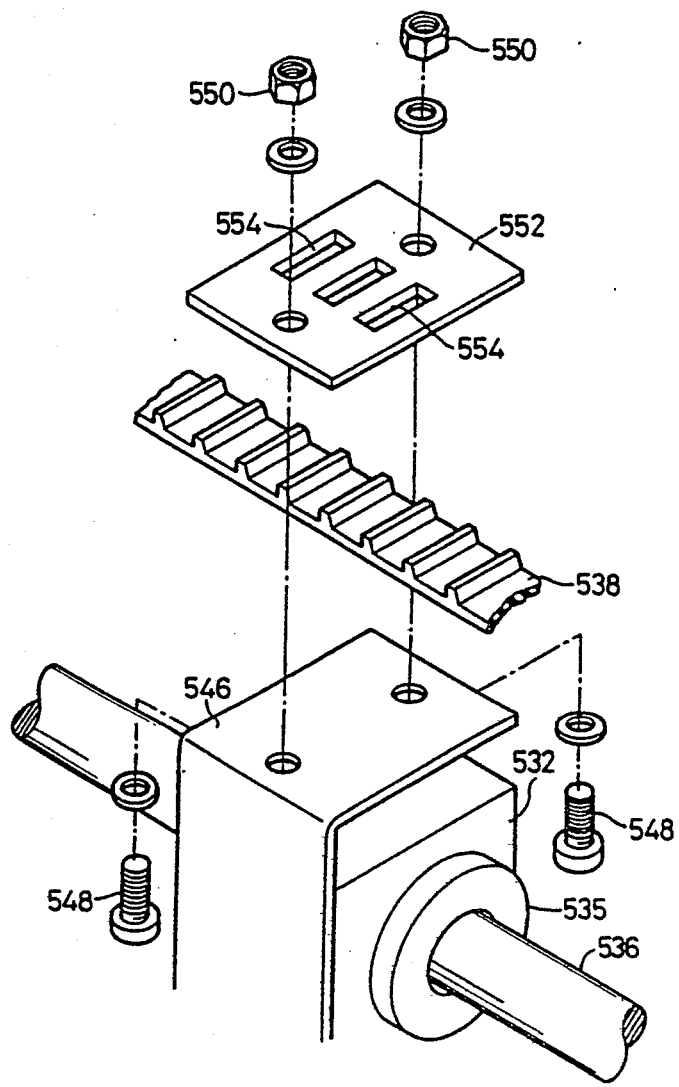
FIG. 19 is an exploded perspective view showing the relationship between a movable block and a timing belt when assembled.

The way in which each of the movable blocks 530 and 532 is secured to the corresponding timing belt 538 is described hereinunder with respect to the movable block 532 as an example and with reference to FIG. 19.

An L-shaped plate 546 is secured to the movable block 532. The distal end portion of the plate 546 is so designed that a mounting plate 552 is secured thereto by means of screws 548 and nuts 550. The timing belt 538 is clamped between the mounting plate 552 and the L-shaped plate 546. The mounting plate 552 has slots 554 for receiving a plurality of timing projections of the timing belt 538. In this way, the movable block 532 is reliably secured to an intermediate portion of the timing belt 538.

In the movable block 530, as shown in FIG. 16, the mounting plate 552 is secured to the side of the distal end portion of the L-shaped plate 546 which is closer to the movable block 530 in contrast to the movable block 532 shown in FIG. 19.

Thus, the movable blocks 530 and 532 are respectively secured to the two straight portions of the timing belt 538 which extend parallel to each other between the pulleys 540 and 542, and the masking rollers 526 and 528 are constantly positioned at equal distances from the imaginary line extending through the respective axes of the obverse-side rollers 462 and 464. In consequence, these movable blocks 530 and 532 in combination constitute a mechanism which guides the rollers 526 and 528 in opposite directions. Accordingly, as the motor 544 rotates, the rollers 526 and 528 move toward or away from each other by equal distances from the optical axis of exposure light. In this way, the rollers 526 and 528 press the emulsion-coated side of the film 414 positioned in the optical path of exposure light against the pressure plates 512 and 504 and move toward or away from the optical axis of exposure light in accordance with the size of an image to be formed during a separate photographic operation, so that the rollers 526 and 528, together with the pressure plates 502 and 504, clamp the film 414 at the peripheral edges of the exposed area thereon, thereby maintaining the film 414 in a straight condition.

Although in this embodiment the guide mechanisms for guiding the masking rollers 526 and 528 in opposite directions are disposed at both sides in the axial direction of the rollers 526 and 528, such arrangement is not necessarily limitative, and the arrangement may be such that a guide mechanism is provided at only one side in the axial direction of the rollers 526 and 528.

(The arrangement of the exposure unit 418)

Referring to FIG. 7, a monitor (CRT) 556 which serves as an image display device is mounted on a movable plate 558 which is supported by a guide bar 564 through a bracket 560. The guide bar 564 extends in such a manner that its axis is horizontal, and enables the movable plate 558 to move thereon along its axis so as to vary the optical path length between the monitor (CRT) 556 and the film 414 positioned in the optical path of exposure light.

Figure 20:
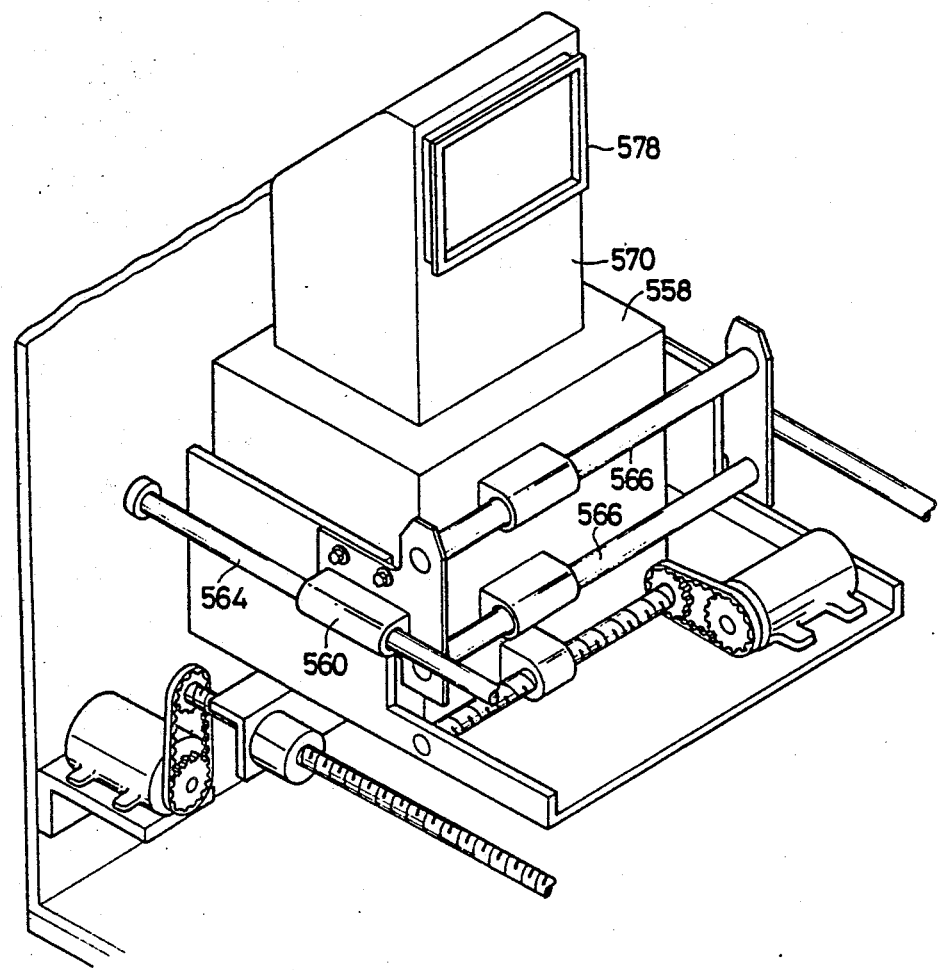
FIG. 20 is a perspective view of a monitor when mounted.

As shown in FIG. 20, the movable plate 558 can move laterally of the film 414 positioned in the optical path of exposure light by moving along a guide bar 566, which is extended over the bracket 560, in the direction orthogonal to the axis of the guide bar 564.

Accordingly, the monitor 556 can move rightwards and leftwards as viewed in FIG. 7 as well as in the direction orthogonal thereto, and the film 414 positioned in the optical path of exposure light can be moved by the operation of the film retaining section 416. It is therefore possible for an projected image of any desired size to be formed at a desired position on the film 414.

A cover 570 projects upwardly from the monitor 556. A photographic lens 572 and a shutter 574 are disposed at an intermediate portion of the cover 570. The cover 570 is provided at its top portion with a reflecting mirror 576 and a flange 578 which is directed toward the film retaining section 416.

A bellows 580 (also shown in FIGS. 21 and 22) which serves as a stretchable tube is extended between the flange 578 and the vertical wall 438. The bellows 580 prevents the ambient light from entering, which would otherwise undesirably expose the film 414 positioned in the optical path of exposure light, even when the monitor 556 is moved along the guide bar 564 so as to vary the length of the optical path of exposure light.

Figure 21:
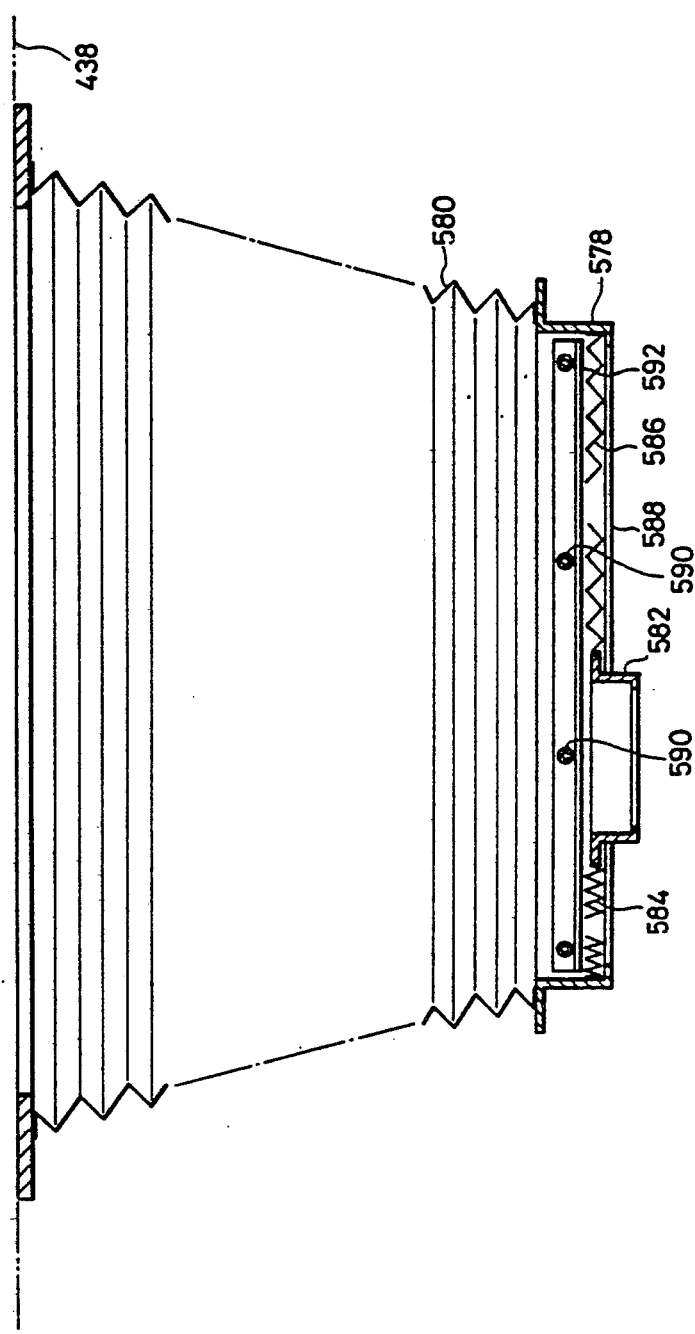
FIG. 21 is a section through a bellows, which is equivalent to a section taken along the line XXI—XXI of FIG. 7.
Figure 22:
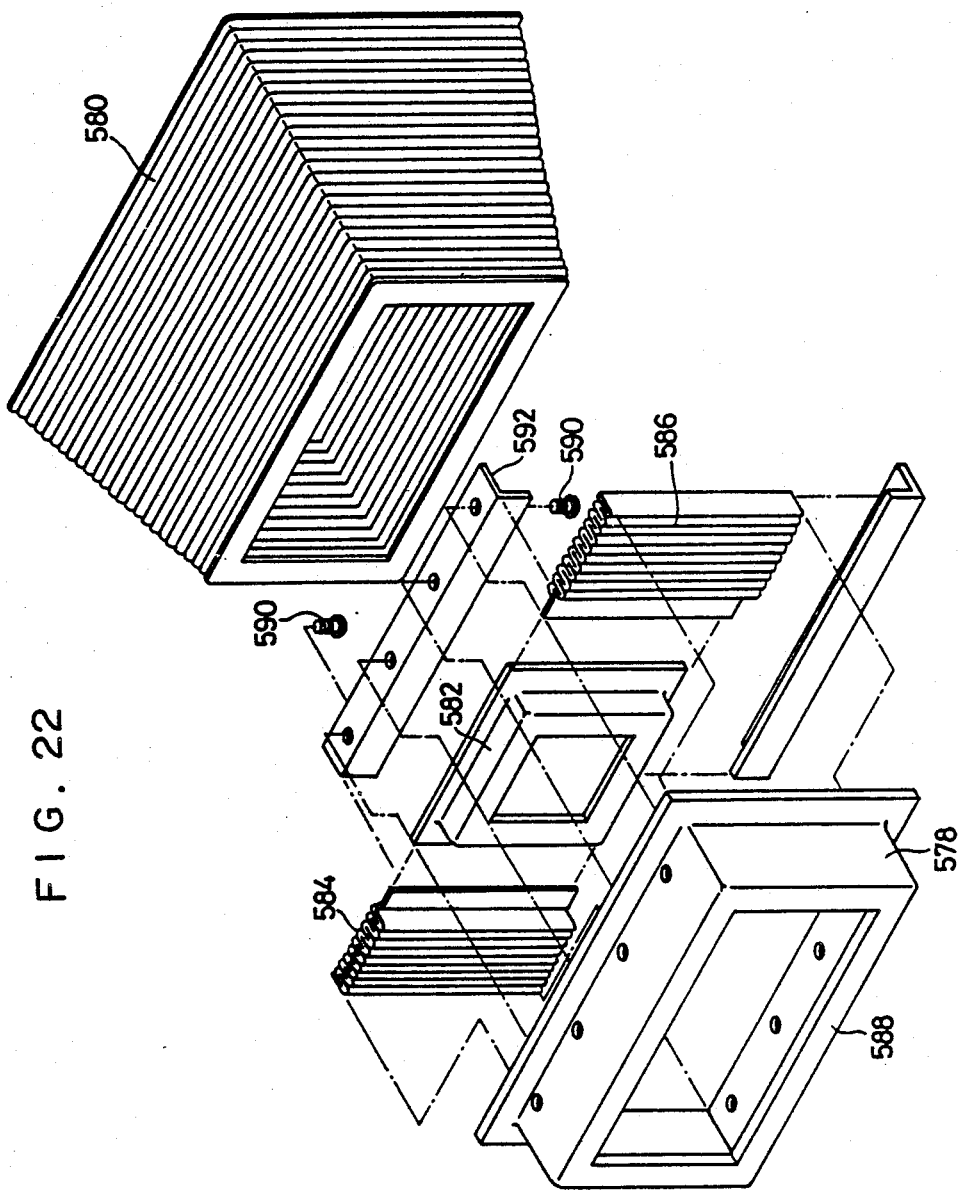
FIG. 22 is an exploded perspective view of the bellows shown in FIG. 21.

As shown in FIGS. 21 and 22, the flange 578 is formed in the shape of a frame which has a rectangular opening, thus constituting a guide frame member through which a mask frame member 582 can move longitudinally of the flange 578. Accordingly, the mask frame member 582 can move in response to the movement of the monitor 556 in the lateral direction of the film 414 positioned in the optical path of exposure light.

One end of each of the stretchable pieces 584 and 586 is secured to each of the lateral sides of the mask frame member 582, and the other ends of the pieces 584 and 586 are respectively secured to two inner peripheral portions of the flange 578. The mask frame member 582 and the stretchable pieces 584, 586 are mounted on the flange 578 in such manner that their respective upper and lower portions are disposed between a stopper 588 which slightly projects into the opening of the flange 578 and angle-section steel bars 592 which are secured to the inside of the flange 578 by screws 590.

(The arrangement of the film housing section 420)

As shown in FIG. 7, the film housing section 420 is disposed below the film retaining section 416. In the film housing section 420, a chute 598 is disposed which guides the film 414 which has been subjected to exposure into an area between the guide rollers 594 and 596. The film 414 fed out from the guide rollers 594 and 596 is moved into a housing magazine 600 which is loaded into the lower portion of the frame 410. After a predetermined number of films 414 have been housed in the magazine 600, its cover 602 is closed, and the magazine 600 is unloaded from the film housing section 420 and is then delivered to a development process.

(The operation of the second embodiment)

As shown in FIG. 7, the magazine 422 loaded with a plurality of sheets of film 414 is mounted on the upper portion of the frame 410. The cover 424 is then opened.

The drive unit 428 actuates the suction pad 426 so as to hold the uppermost one of the plurality of sheets of film 414 and to feed the leading end of the film 414 into an area between the feed rollers 430 and 432.

The feed rollers 430 and 432 are driven by the motor (not shown) in such a manner as to feed out the film 414 onto the guide plate 434. The film 414 which is placed temporarily on the guide plate 434 moves into an area between the feed rollers 432 and 436 by its own weight from its trailing end. The feed rollers 432 and 436 are rotated by the motor (not shown) so as to feed the film 414 to the film retaining section 416.

In the film retaining section 416, the film 414 is moved downward while being fed by the pairs of guide rollers 450, 451 and 452, 453 and is positioned in the optical path of exposure light. Both lateral edge portions of the film 414 are clamped between the reverse-side rollers 460 and the obverse-side rollers 462, 464, whereby the film 414 is reliably maintained in the optical path of exposure light. When the film 414 is fed into the film retaining section 416 in this way, the pressure plates 502 and 504 shown in FIG. 8 are separated from the guide plates 494 and 496.

The film 414 is moved vertically within the film retaining section 416 in accordacne with the required size and position of an image which is to be formed on a part of the film 414 for the purpose of separate photography. More specifically, when an image is to be formed in a lower part of the film 414, the portion of the film 414 which is slightly above its lower end is clamped by the reverse-side rollers 460 and the obverse-side rollers 462, 464, while the upper end portion of the film 414 is clamped by the pairs of guide rollers 452, 453 and 450, 451. When a part of the film 414 in the vicinity of its upper end is to be exposed, the portion of the film 414 which is lightly below its upper end is clamped by the reverse-side rollers 460 and the obverse-side rollers 462, 464, while the lower end portion of the film 414 is clamped by the pairs of guide rollers 456, 457 and 458, 459.

Since the solenoids 524 are de-energized during the exposure, the tension coil spring 520 presses the pressure plates 502 and 504 against the guide plates 494 and 496 so as to clamp both lateral edge portions of the film 414 in cooperation with the reverse-side rollers 460 and the obverse-side rollers 462, 464.

At the same time, the masking rollers 526 and 528 are moved vertically by the motor 544 in accordance with the size of the image to be formed on a part of the film 414 so that the portions of the film 414 which are respectively positioned at the upper and lower ends of the frame defined by the rollers 526 and 528 are pressed against the pressure plates 502 and 504, thereby maintaining the exposed surface of the film 414 in a straight condition and preventing the other part of the film 414 from being exposed. When no separate photography is required, the masking rollers 526 and 528 are maximumly moved in the vertical direction so as to press the upper and lower end portions of the film 414 against the pressure plates 502 and 504.

As shown in FIG. 9, the obverse-side rollers 462 and 464 are spaced from each other to ensure that the optical path of exposure light is not obstructed. Accordingly, when the shutter 574 of the exposure unit 418 opens, exposure is effected only in the part of the film 414 defined between the masking rollers 526 and 528.

In the exposure unit 418, the monitor 556 may move rightward and leftward as viewed in FIG. 7 as well as in the direction orthogonal thereto in accordance with the size of the image to be formed on a part of the film 414. In this case, however, the bellows 580 can cope with variations in the length of the optical path, and the stretchable pieces 584 and 586 can cope with the movement of the monitor 556 in the lateral direction of the film 414. It is therefore possible to effect reliable exposure irrespective of the direction in which the monitor 556 moves.

The film 414 which has been subjected to exposure is fed from the film retaining section 416 to the film housing section 420 by the operation of the motor 482 and is housed in the magazine 600. When a plurality of sheets of film 414 have been subjected to exposure and housed in the magazine 600, it is unloaded from the film housing section 420 and sent to the development process.

Although in the above-described embodiment the obverse-side rollers 462 and 464 are projected from the brackets 442 and 444 in a cantilever fashion, it is also possible to support both ends of each of the obverse-side rollers 462 and 464.

What is claimed is:

1. A cathode-ray tube image recording apparatus which records a cathode-ray tube image on a film, comprising:
   (a) a cathode-ray tube;
   (b) a lens of a focal length f disposed on the axis of the optical path of exposure light from said cathode-ray tube;
   (c) a mirror which turns the path of the light transmitted by said lens through about 90° so that an image is formed on said film;
   (d) lens-moving means for moving said lens along its optical axis;
   (e) main body-moving means for moving a main body, together with said lens-moving means in one unit, in the direction orthogonal to the plane of said film, said main body being constituted by said cathode-ray tube, said lens, and said mirror;
   (f) movement control means, connected to said lens moving means and said main body moving means, for automatically controlling movements of each of said lens and said main body; and
   (g) reference position detecting means for detecting respective reference positions of said main body and said lens,
   said movement control means being connected to said reference position detecting means, said control means also including f value input means and recording mode setting means and providing control such that, with a recording position at magnification $m_0$ employed as a reference position, when recording at magnification m, said main body is automatically controlled to move from its current position, that is, a recording position at magnification $m_1$ by $(m + 1/m - m_1 - 1/m_1)f$, and said lens is automatically controlled to move from the recording position at magnification $m_1$ by $(1/m - 1/m_1)f$.

2. A cathode-ray tube image recording apparatus according to claim 1, further comprising a shutter between said cathode-ray tube and said mirror.

3. A cathode-ray tube image recording apparatus according to claim 2, wherein said shutter opens for a period of time $(1+m)^2 t_1/4$, in which $t_1$ represents an exposure time at an actual-size recording position at which $m=1$.

4. A cathode-ray tube image recording apparatus according to claim 1, further comprising a film retaining section which retains said film in the optical path of exposure light in such a manner that its plane is substantially vertical and which moves said film substantially vertically.

5. A cathode-ray tube image recording apparatus according to claim 4, wherein said film retaining section includes an obverse-side roller provided on the exposed surface side of said film positioned in the optical path of exposure light and a reverse-side roller which is provided on the side of said film opposite to the exposed surface and clamps said film together with said obverse-side roller, said obverse-side roller being disposed at each of the lateral edge portions of said film, whereby it is possible to ensure that the optical path of exposure light applied to said film is not obstructed.

6. A cathode-ray tube image recording apparatus according to claim 4, wherein said obverse-side roller has one axial end thereof rotatably supported in a cantilever fashion.

7. A cathode-ray tube image recording apparatus according to claim 6, wherein either one of said obverse-side roller and said reverse-side roller is provided on its surface with friction increasing means which has high frictional characteristics.

8. A cathode-ray tube image recording apparatus according to claim 7, wherein either one of said obverse-side roller and said reverse-side roller is movable in the direction in which it moves toward and away from the other, and is biased in the direction in which it moves toward the other roller by biasing means.

9. A cathode-ray tube image recording apparatus according to claim 1, further comprising: retainer means disposed such as to face the reverse side of said film positioned in the optical path of exposure light; a pair of masking rollers disposed on both sides of the axis of exposure light such as to face the exposed surface of said film so that said film is clamped between said retainer means and said masking rollers; and guide means for moving said masking rollers in opposite directions by equal distances from the axis of the exposure light.

10. A cathode-ray tube image recording apparatus according to claim 9, wherein said guide means includes a first guide mechanism which moves said masking rollers straight in the direction orthogonal to the axes of roller shafts of said masking rollers, and a second guide mechanism which moves said masking rollers in opposite directions.

11. A cathode-ray tube image recording apparatus according to claim 10, wherein said second guide mechanism includes a timing belt which is stretched between a pair of pulleys, said pair of masking rollers being respectively secured to parallel portions of the loop of said belt.

12. A cathode-ray tube image recording apparatus according to claim 11, wherein said retainer means is constituted by a pressure plate which is disposed such as to face the reverse side of said film.

13. A cathode-ray tube image recording apparatus according to claim 12, wherein said pressure plate is able to move toward and away from the film moving locus by the action of biasing means.

14. A cathode-ray tube image recording apparatus which records a cathode-ray tube image on a film for effecting exposure, comprising:
   (a) a cathode-ray tube;
   (b) optical means including a lens of a focal length $f$ disposed on the axis of the optical path of exposure light from said cathode-ray tube, and a mirror which turns the path of the light transmitted by said lens through about 90° so that an image is formed on said film;
   (c) a film retaining section which retains said film in the optical path of exposure light in such a manner that the plane of said film is substantially vertical and which moves said film substantially vertically;
   (d) lens-moving means for moving said lens along its optical axis;
   (e) main body-moving means for moving a main body, together with said lens-moving means in one unit, in the direction orthogonal to the plane of said film, said main body being constituted by said cathode-ray tube, said lens, and said mirror;
   (f) movement control means, connected to said lens moving means and said main body moving means, for controlling movements of each of said lens and said main body; and
   (g) reference position detecting means for detecting respective reference positions of said main body and said lens,
   said movement control means being connected to said reference position detecting means, said control means also including f value input means and recording mode setting means and providing control such that, with a recording position at magnification $m_0$ employed as a reference position, when recording at magnification $m$, said main body is automatically controlled to move from its current position, that is, a recording position at magnification $m_1$ by $(m+1/m-m_1-1/m_1)f$, and said lens is automatically controlled to move from the recording position at magnification $m_1$ by $(1/m-1/m_1)f$.

15. A cathode-ray tube image recording apparatus according to claim 14, further comprising a shutter between said cathode-ray tube and said mirror.

16. A cathode-ray tube image recording apparatus according to claim 15, wherein said shutter opens for a period of time $(1+m)^2 t_1/4$, in which $t_1$ represents an exposure time at an actual-size recording position at which $m=1$.

17. A cathode-ray tube image recording apparatus according to Claim 14, wherein said film retaining section includes an obverse-side roller provided on the exposed surface side of said film positioned in the optical path of exposure light and a reverse-side roller which is provided on the side of said film opposite to the exposed surface and clamps said film together with said obverse-side roller, said obverse-side roller being disposed at each of the lateral edge portions of said film, whereby it is possible to ensure that the optical path of exposure light applied to said film is not obstructed.

18. A cathode-ray tube image recording apparatus according to claim 17, wherein said obverse-side roller has one axial end thereof rotatably supported in a cantilever fashion.

19. A cathode-ray tube image recording apparatus according to claim 18, wherein either one of said obverse-side roller and said reverse-side roller is provided on its surface with friction increasing means which has high frictional characteristics.

20. A cathode-ray tube image recording apparatus according to claim 19, wherein either one of said obverse-side roller and said reverse-side roller is movable in the direction in which it moves toward and away from the other, and is biased in the direction in which it moves toward the other roller by first biasing means.

21. A cathode-ray tube image recording apparatus according to claim 14, further comprising: retainer means disposed such as to face the reverse side of said film positioned in the optical path of exposure light; a pair of masking rollers disposed on both sides of the axis of exposure light such as to face the exposed surface of said film so that said film is clamped between said retainer means and said masking rollers; and guide means for moving said masking rollers in opposite directions by equal distances from the axis of the exposure light.

22. A cathode-ray tube image recording apparatus according to claim 21, wherein said guide means includes a first guide mechanism which moves said masking rollers straight in the direction orthogonal to the axes of roller shafts of said masking rollers, and a second guide mechanism which moves said masking rollers in opposite directions.

23. A cathode-ray tube image recording apparatus according to claim 22, wherein said second guide mechanism includes a timing belt which is stretched between a pair of pulleys, said pair of masking rollers being respectively secured to parallel portions of the loop of said belt.

24. A cathode-ray tube image recording apparatus according to claim 23, wherein said retainer means is constituted by a pressure plate which is disposed such as to face the reverse side of said film.

25. A cathode-ray tube image recording apparatus according to claim 24, wherein said pressure plate is able to move toward and away from the film moving locus by the action of second biasing means.

* * * * *